United States Patent

Ogino et al.

[11] Patent Number: 5,818,421
[45] Date of Patent: Oct. 6, 1998

[54] INPUT INTERFACE APPARATUS FOR LARGE SCREEN DISPLAY

[75] Inventors: Masanori Ogino; Keiichiro Tanaka, both of Yokohama; Tetsuo Iwamoto, Tokorozawa; Kousyu Ichikawa, Yokohama; Hideyuki Fuma, Fujisawq, all of Japan

[73] Assignee: Hitachi, Ltd., Tokyo, Japan

[21] Appl. No.: 573,013

[22] Filed: Dec. 15, 1995

[30] Foreign Application Priority Data

Dec. 21, 1994 [JP] Japan .................................. 6-317945

[51] Int. Cl.⁶ ...................................... G09G 5/08
[52] U.S. Cl. ...................... 345/157; 345/182; 345/183; 178/18
[58] Field of Search ..................... 345/157, 173, 345/175, 180, 181, 182, 183; 178/17, 18

[56] References Cited

U.S. PATENT DOCUMENTS 4,814,552  3/1989  Stefik et al. ........................ 345/183
5,525,981  6/1996  Abernethy ........................... 178/18

FOREIGN PATENT DOCUMENTS

| 60-65327 | 4/1985 | Japan . |
| 60-70219 | 4/1985 | Japan . |
| 61-62122 | 3/1986 | Japan . |
| 61-91715 | 5/1986 | Japan . |
| 61-156329 | 7/1986 | Japan . |
| 61-246828 | 11/1986 | Japan . |
| 5-127823 | 5/1993 | Japan . |
| 5-153532 | 6/1993 | Japan . |

*Primary Examiner*—Matthew Luu
*Attorney, Agent, or Firm*—Kenyon & Kenyon

[57] ABSTRACT

A large screen display comprising an image signal source such as a computer, an original image generator, a light-transmission screen, an on-screen pointing-position detecting means, and a light-pen built in an infra-red-ray emitting modulating means, wherein infra-red rays which are modulated by pressing force generated when the light-pen is pressed against the screen by an operator are emitted and the infrared rays are detected and amplified by an infrared-ray detector and demodulated by a demodulating means and then inputted to the image signal source, so that the tone and thickness of each stroke of a figure to be drawn and displayed can be displayed.

13 Claims, 5 Drawing Sheets

INPUT INTERFACE APPARATUS FOR LARGE SCREEN DISPLAY

BACKGROUND OF THE INVENTION

1. Field of the Invention

The present invention relates to an input interface apparatus for a large screen display and particularly to an input device via a light-transmissive screen of a large screen display.

2. Description of the Prior Art

Recently, the large screen projection display technology has made remarkable progress.

A high definition display image generated by a computer work station can be displayed on a rear projection type screen with of a blackboard size (an effective height of about 1 m and a width of about 1.5 m).

By using this screen as an input device of a man-machine interface, improvement of the efficiency of an electronic conference has been tried.

There exist an on-screen pointing-position detecting means, called a touch panel system in which a conductive resistor film is added on two opposite surfaces of a plurality of element sheets constituting a screen. However, the light reflection factor of the surface of the conductive resistor film of the touch panel system is can be as high as about 10%, causing the contrast ratio of an image, (the image quality) to become degraded. The reason for this is because light surface reflection factor R is expressed by the following formula, and the refractive index n of the constituent material of an ordinary lighttransmissive screen is about 1.5, and the value of n of the material of the conductive resistor film (ITO) is about 2.

Formula 1

$$R = (n-1/n+1)^2 \quad (1)$$
$$= \{0.04 \text{ for } n \approx 1.5$$
$$0.11 \text{ for } n \approx 2.0\}$$

As another system to overcome this problem, a method for arranging an infrared ray camera behind the lighttransmissive screen, that is, on the projector side and accessing the screen by a pen (light-pen) emitting infrared rays has be tried. It is shown in FIG. 1.

In the drawing, numeral 1 indicates an image signal source means such as a computer or others, 2 an original image generator, 3 an original image generation surface, 4 a projection lens, 5 a screen, 6 a light pen for emitting infrared rays, 601 an infrared ray emitting button, and 7 an infrared ray camera used as an on-screen painting position detecting means. When the button (601) is pressed by an operator with his finger, infrared rays are emitted and reach the camera (7) via the screen (5). The pen pointing position on the screen is identified by the camera (7) and the position information is transferred to the image signal source means (1). On the basis of just the same principle as the one of that a personal computer is instructed and reacted by a mouse, a computer built in the image signal source (1) or the original image generator (2) reacts according to the pen pointing position. Namely, a pen operator and the image signal source perform operations interactively.

The following problems are imposed in the aforementioned prior art.

(1) When an operator presses the button (601) with his finger, the direction of the light-pen goes wrong depending on the finger pressure, accordingly the pointing position on the screen goes wrong. As a result, the image signal source (1) produces an incorrect reaction which is different from the intention of the operator. Namely, there is a problem of insufficient position pointing precision imposed.

(2) When it is attempted to draw a simple figure or a character on the screen with the infrared ray emitting pen (6), it is necessary to operate the button at the start point and end point of each stroke thereof, so that it is extremely hard to handle the apparatus. Namely, there is a problem of defective operability imposed.

(3) Infrared rays emitted from the infrared ray emitting light pen are limited to one kind of type, so that it is difficult to distinguish and use properly the thickness and color of a simple figure or a character to be drawn.

SUMMARY OF THE INVENTION

The present invention is solves at least one of the aforementioned problems (1) to (3) of the prior art. Namely:

(1) Improvement of the pointing-position detection precision on the screen, (2) Elimination of button operation at the start point and end point of each stroke when a figure or a character is drawn on the screen and improvement of the operability, and (3) Distinguishing of the thickness and color of each stroke of a figure or a character to be drawn.

The present invention is an input interface apparatus for a large screen display comprising a light-transmissive screen, a pointing position detecting means on the screen, and an image signal source, and the apparatus has a light-pen for emitting infrared rays and an infrared ray modulation signal detecting means, and the light-pen has a pressing force detector for detecting the pressing force when the tip of the light-pen is pressed against the screen and a modulator for modulating the output of infrared rays according to the detected pressing force.

The aforementioned infrared ray modulation signal detecting means comprises an infrared ray detector for detecting the output of infrared rays, a demodulator for demodulating the detected infrared rays, and a device for inputting the demodulated signal to the image signal source.

The present invention has a pressure-sensitive means which opens or closes according to the pressure when the light-pen is pressed against the screen surface and generates output according to the pressure.

The present invention has an emitted infrared ray modulator in the light-pen so as to distinguish the color and tone of a figure to be drawn and furthermore a modulation signal detecting means so as to discriminate the tone of a figure to be drawn.

The present invention having the aforementioned constitution has the operation and function indicated below.

The pressure-sensitive means opens or closes according to pressure which generates naturally when the light-pen is pressed against the screen surface and emits infrared rays in the switch closed state. Therefore, an error in the light-pen pointing direction which occurs inevitably when the button (601) attached to the side of the light-pen (6) in the prior art is pressed will not occur. Therefore, the problem of insufficient position pointing precision can be overcome. Furthermore, the start point and end point of each stroke of a figure can be realized by an extremely natural operation such as pressing start and pressing end of the tip of the light-pen against the screen surface. Therefore, the problem of defective operability in the prior art can be overcome and solved.

The infrared ray modulator has an operation of selection of the kind of a modulation signal for modulating emitted infrared rays by operating the selection switch attached in the light-pen. Each kind of a modulation signal means a different tone attribute and character thickness and color.

The modulation signal detecting means comprises an infrared ray detector and a demodulator. The demodulator demodulates the aforementioned modulation signal and identifies the kind thereof, and then discriminates the tone attribute of a figure to be drawn. Therefore, the thickness and color of a figure or a character to be drawn can be distinguished and properly used.

The foregoing and other objects, advantages, manner of operation and novel features of the present invention will be understood from the following detailed description when read in connection with the accompanying drawings.

DETAILED DESCRIPTION

Figure 1:
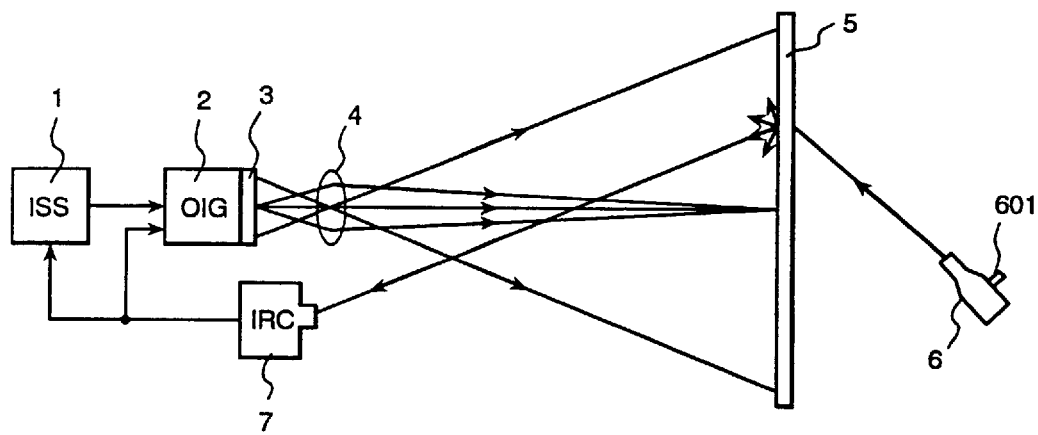
FIG. 1 is a drawing showing the constitution of the prior art.
Figure 2:
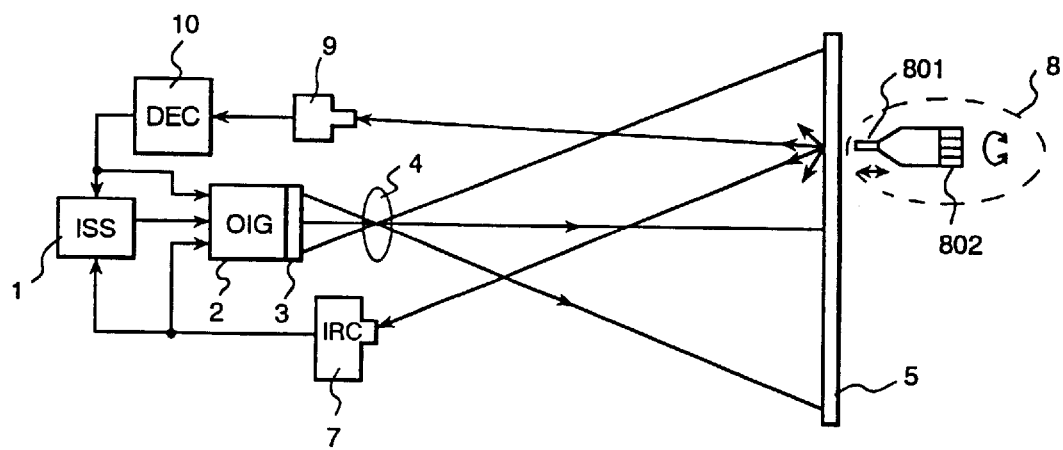
FIG. 2 is a drawing showing the constitution of the basic embodiment of the present invention.

The present invention is shown in FIG. 2. In the drawing, numerals 1 to 7 are the same as those shown in FIG. 1. Numeral 8 indicates a modulating means built-in type light-pen means, 9 an infrared ray detecting means, and 10 a demodulating means. A light emission diode is built in the tip 801 of the light-pen means (8) and a rotary switch is built in the rear end 802.

Figure 3:
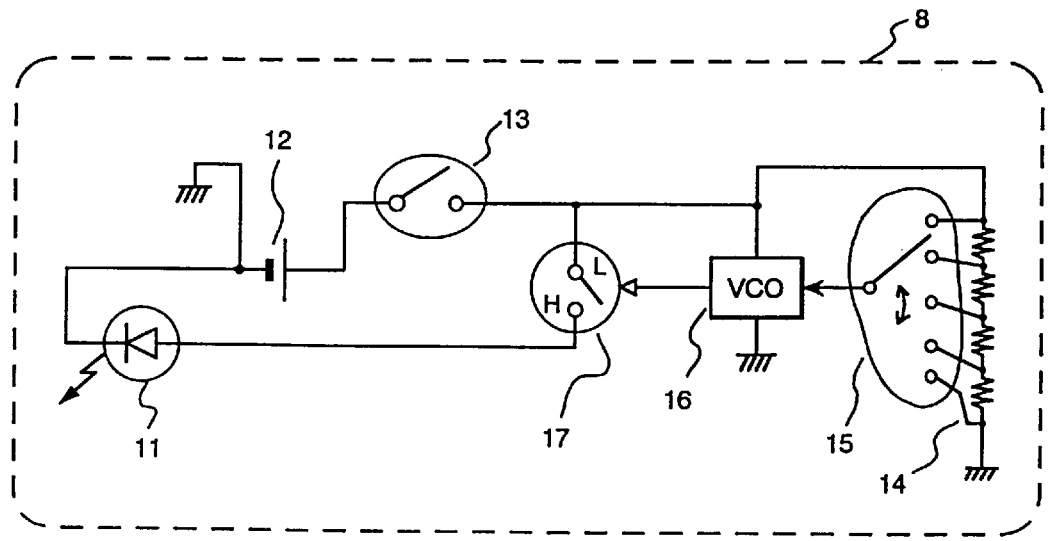
FIG. 3 is a drawing showing an example of the detailed constitution of the essential section shown in FIG. 2.

The inner detailed constitution of the light-pen means (8) is shown in FIG. 3.

In FIG. 3, numeral 11 indicates a light emission diode, 12 a battery, and 13 a pressure-sensitive switch means. The light-pen means (8) operates so that the switch enters the conductive state by the pressure when the tip of the light-pen means (8) is pressed against the screen surface. Numeral 14 indicates a voltage division resistor and 15 a multi-point selection switch (example: rotary switch) and a modulation signal is obtained from the output thereof. Numeral 16 indicates a voltage control generator and the oscillating frequency thereof is selected as a value higher than the refresh rate of the infrared ray camera (7). By doing this, the on-screen pointing-position detecting means (infrared ray camera 7) can detect the pointing-position in response to a change in the pointing position. Numeral 17 indicates an electron switch. When the input thereof is H, the apparatus is in the conductive state and when the input thereof is L, the apparatus is in the nonconductive state. Namely, the numerals 16 and 17 form an infrared ray blinking frequency modulating means.

When the light-pen is pressed against the screen surface by a hand of an operator, infrared rays blinking at a frequency according to the set position of the rotary switch (15) are emitted from the tip (801) of the light-pen means (8). In this case, by frictional force generated when the light-pen (8) is pressed against the screen surface or others, the pointing position is prevented from going wrong as in the prior art.

Figure 4:
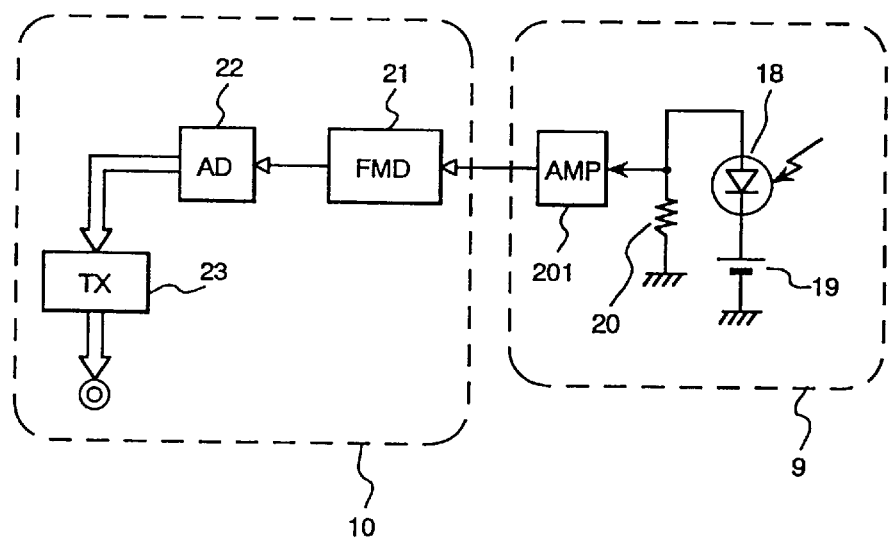
FIG. 4 is a drawing showing an example of the detailed constitution of the essential section shown in FIG. 2.

In FIG. 4, the detailed constitutions of the infrared ray detecting means (9) and the demodulating means (10) are shown. In the drawing, numeral 18 indicates a photodiode, 19 a power source, 20 a current detection resistor, 201 an amplifier, 21 a frequency discriminator, 22 an AD converter, and 23 a transmitter for transferring the display color and tone to the image signal source (1) such as a computer. As a signal transmission type of the transmitter (23), a serial transmission type such as, for example, known RS-232C can be used.

By using a combination of the constitutions shown in FIGS. 3 and 4, it is possible to emit infrared rays blinking at a different frequency from the light-pen means (8) according to the set position of the rotary switch (15), distinguish the predetermined corresponding tone according to the blinking frequency thereof by the modulation signal detecting means comprising the infrared ray detecting means (9) and the demodulating means (10), and transfer it to the image signal source (1). Now, the explanation of FIGS. 3 and 4 ends.

Figure 5:
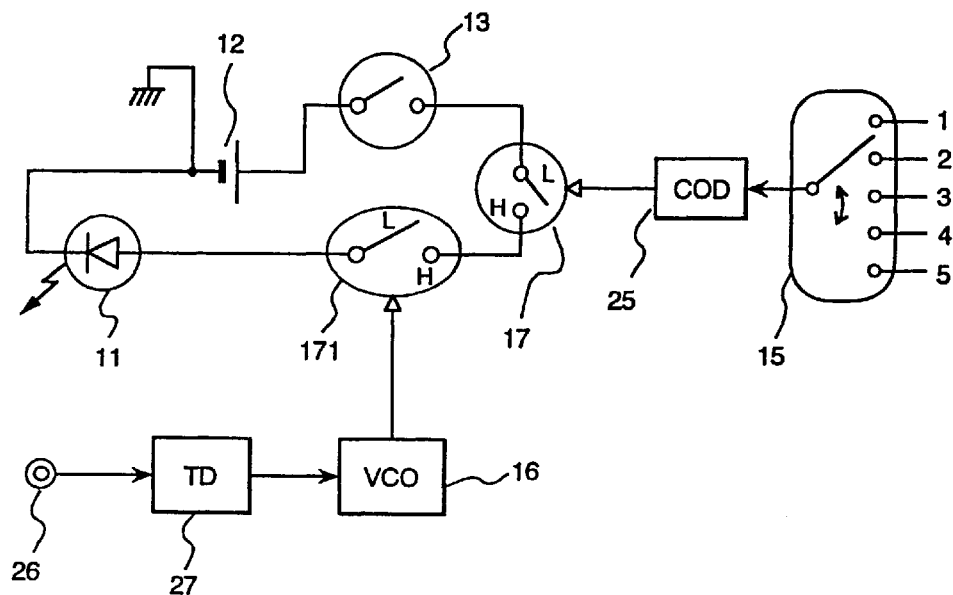
FIG. 5 is a drawing showing a deformation example of FIG. 3.
Figure 6:
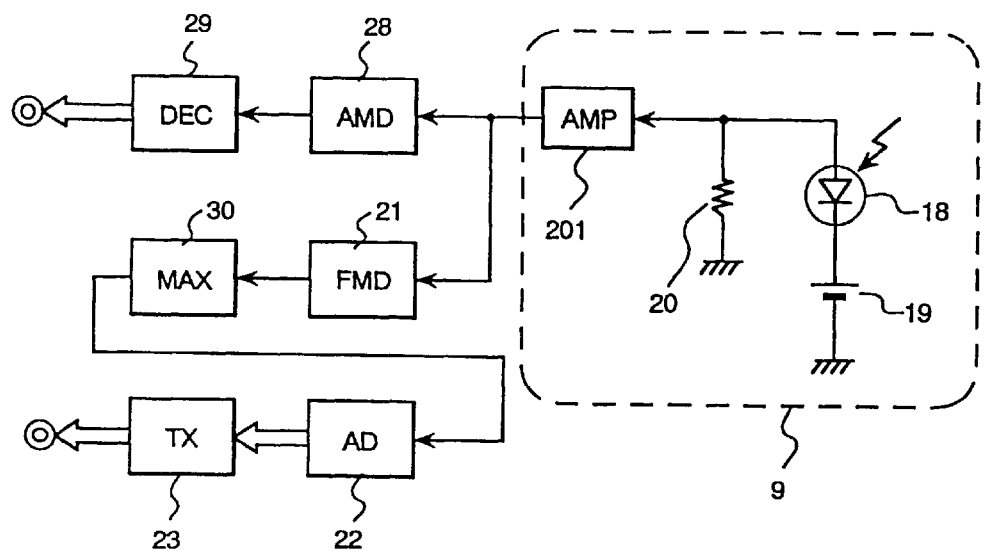
FIG. 6 is a drawing showing a deformation example of FIG. 4.

Another example of the constitution of the light-pen means (8) is shown in FIG. 5 and the corresponding demodulating means is shown in FIG. 6.

In FIG. 5, numerals 11, 12, 13, 15, 16, and 17 are the same as those shown in FIG. 3. Numeral 171 indicates an electron switch in the same way as with 17. Numeral 25 indicates an encoder, which outputs a corresponding fixed pulse train according to the selection position of the rotary switch (15). Numeral 26 indicates pressure to be pressed against the screen surface by the light-pen (8) and 27 a piezo-electric element for converting pressure to a voltage.

In FIG. 6, numerals 9, 18, 19, 20, 201, 21, 22, and 23 are the same as those shown in FIG. 4. Numeral 28 indicates an envelope detector, 29 a decoder, and 30 a maximum value detector.

The operations shown in FIGS. 5 and 6 will be explained by referring to the waveform drawings shown in FIG. 7.

Figure 7:
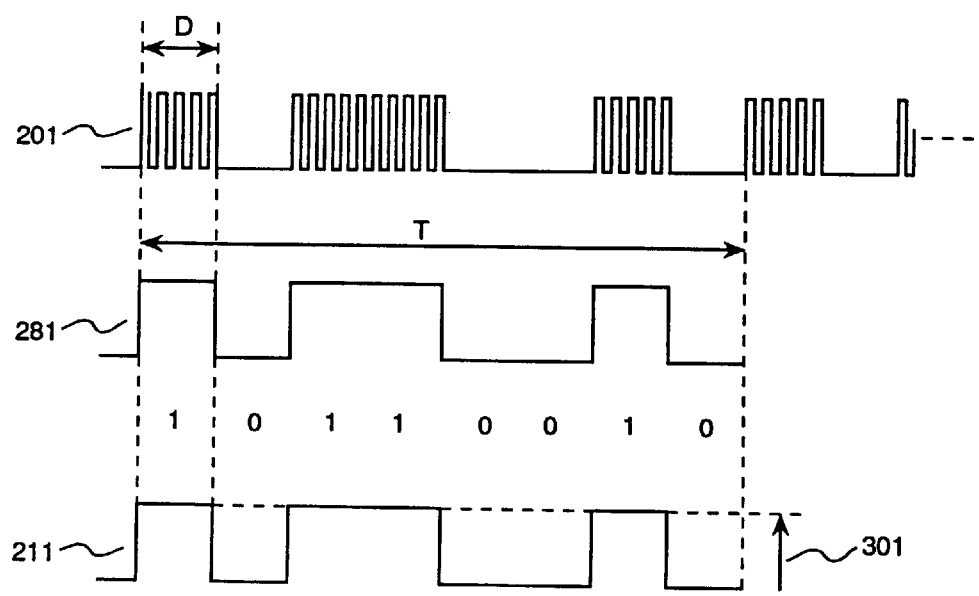
FIG. 7 is a waveform drawing for explaining the operations shown in FIGS. 5 and 6.

In FIG. 7, numeral 201 indicates an output waveform of the infrared ray detecting means (9) and it is similar to a light output of the constitution shown in FIG. 5. A symbol T indicates a repetitive period of a pulse train and D a minimum pulse width. T is selected as a value smaller than the refresh period (normally about 16 ms) of the infrared ray camera (7). The oscillating frequency of the voltage control generator (16) is selected as a value about 10 times of the reciprocal number of D or more.

Numeral 281 indicates an output waveform of the envelope detector (28), 211 an output waveform of the frequency discriminator (21), and 301 an amplitude of the output voltage of the maximum value detector (30). The waveform 281 is decoded by the decoder (29) and the color and tone according to the selection position of the rotary switch (15) are instructed to the image signal source (1). The amplitude 301 is a quantity in proportion to the pressing force of the light-pen and transferred to the image signal source (1) via 22 and 23 and the thickness of each stroke of a figure or a character to be displayed is controlled. Therefore, when a character is written by pressing the light-pen means (8) strongly against the screen surface, a thick character can be written. When a character is written by pressing the light-pen means (8) weakly against the screen surface inversely, a thin character can be written.

Figure 8:
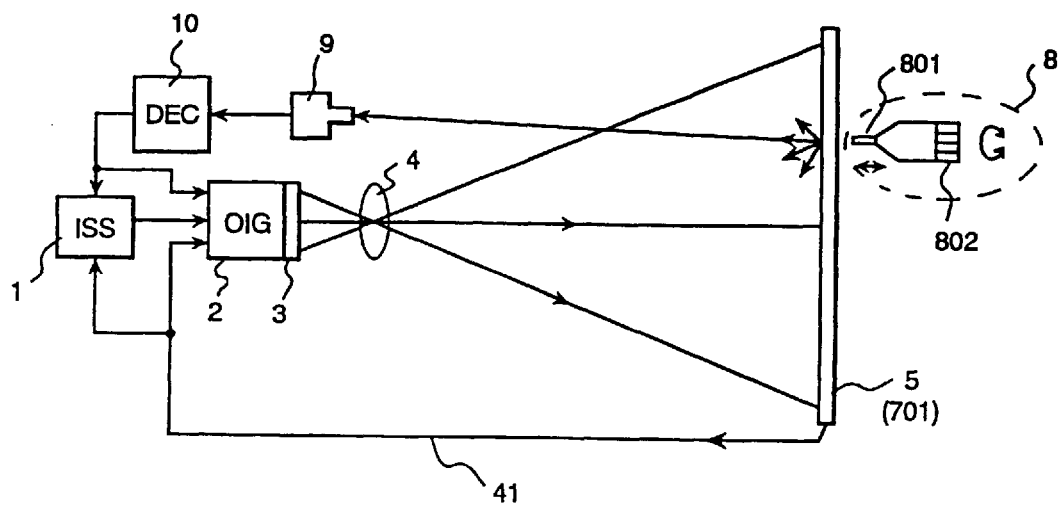
FIG. 8 shows still another deformation embodiment of the present invention.

In the description of the aforementioned embodiments, it is indicated that the infrared ray camera (7) is used as an on-screen position pointing means. However, instead of it, the present invention may be used in combination with a so called touch panel system of a type that a conductive resistor film is added onto a light-transmissive screen. The reason is that even in the conventional conductive resistor film use method, the modulation of infrared rays emitted from the infrared ray light-pen is of a single type, so that the thickness and color of a character cannot be distinguished and used properly. An embodiment thereof is shown in FIG. 8. FIG. 8 is mostly the same as FIG. 2, though a difference is that the pressing position of the light-pen is detected by a touch panel 5 (701) using a transparent conductive resistor film. The pressing position of the light-pen detected in this way is inputted to the image signal source means 1 and the original image generator 2 via a signal path 41. This respect is the same as that the position detection information by the infrared ray camera 7 is inputted to 1 and 2 as shown in FIG. 2.

The present invention not only can be applied usefully to a projection type display having a light-transmissive screen but also can be applied effectively to a direct viewing display having a light-transmissive screen. For example, the present invention can be applied to a liquid crystal panel, the rear panel of which is formed by glass and a transparent conductor, exactly in the same way.

By referring to an example in which when the tone and color are selected by the multi-point selection switch (15) shown in FIGS. 3 and 5, it is assumed that five kinds of tones can be selected, another characteristic is that the content thereof is set in correspondence with, for example, white, black, red, green, and blue and the image signal source means 1 comprising a computer can control according to it. Furthermore, it is also possible to add an eraser function.

According to the present invention, the problems of insufficient position pointing precision and defective operability of a light-pen of the prior art can be dissolved.

Furthermore, the thickness of a figure or a character to be drawn can be distinguished and used properly. In this case, the on-screen pointing-position detecting means of the prior art can be used without contradiction at the same time. Therefore, particularly communication using a large screen display and others can be made satisfactory and smooth substantially.

The invention claimed is:

1. An input interface apparatus for a large screen display having a light-transmissive screen, a pointing position detecting means on said screen, and an image signal source, comprising:
   (1) light-pen means for emitting infrared rays including
       pressing force detecting means for detecting the pressure force when a tip of said light-pen means is pressed against said screen first;
       first modulating means for modulating, with a first type of modulation, the output of infrared rays according to said detected pressing force;
       switching means switching to a conductive state when the pressing force against said screen exceeds a predetermined value; and
       second modulating means for further modulating, with a second type of modulation the infrared rays modulated by said first modulating means;
   (2) infrared ray modulation signal detecting means including:
       infrared ray detecting means for detecting said output of infrared rays;
       demodulating means for demodulating said detected infrared rays;
       means for inputting said demodulated signal to said image signal source; and
       means for changing a picture attribute of at least one of color, thickness and kind of tones in said image signal source, in accordance with said second modulation type.

2. The signal input device according to claim 1 wherein the first modulating type of said first modulating means is frequency modulation by which the blinking frequency of said emitted infrared rays is specified and said blinking frequency is a frequency higher than the refresh rate of said on-screen pointing-position detecting means.

3. The signal input device according to claim 1 further comprising:
   a multi-point selection switch which is built in said light-pen means is so as to switch said frequency of said modulation signal.

4. The signal input device according to claim 3, wherein said frequency of said modulation signal increases or decreases according to the pressing force of said light-pen means.

5. The signal input device according to claim 1 further comprising:
   a multi-point selection switch which is built in said light-pen means so as to switch said frequency of the modulated infrared rays.

6. The signal input device according to claim 2, wherein said frequency of the modulated infrared rays increases or decreases according to the pressing force of said light-pen means.

7. An input interface method for a large screen display system having a light-transmissive screen, a pointing position detecting means on said screen, a light-pen for emitting infrared rays, and infrared ray modulation signal detector and an image signal source, comprising the steps of:
   (1) with said light-pen:
       detecting the pressing force when the tip of said light-pen is pressed against said screen;
       modulating the output of emitted infrared rays of said light pen with a first type of modulation according to the detected pressing force; and
       when the pressing force against said screen exceeds a predetermined value, further modulating the infrared rays modulated by said first modulating with a second type of modulation; and
   (2) with said infrared ray modulation signal detector:
       detecting the modulated output of emitted infrared rays;
       demodulating the detected modulated infrared rays;
       inputting the demodulated infrared rays to said image signal source; and
       changing a picture attribute of at least one of color, thickness and kind of tones in said image signal source, in accordance with said second modulation.

8. An input interface apparatus for a large screen display having a light-transmissive screen, a pointing position detector on said screen, and an image signal source, comprising:
   (1) light-pen for emitting infrared rays including:

a pressing force detector for detecting a pressing force ashen a tip of said light-pen is pressed against said screen;

a first modulator for modulating the output of infrared rays according to said detected pressing force with a first type of modulation;

a switch for switching to a conductive state when the pressing force against said screen exceeds a predetermined value; and a second modulator for further modulating the infrared rays modulated by said first modulator with a second type of modulation;

(2) an infrared ray modulation signal detector including:

an infrared ray detector detecting said emitted infrared rays;

a demodulator demodulating said detected infrared rays;

a device for inputting said demodulated signal to said image signal source; and circuitry for changing a picture attribute of at least one of color, thickness and kind of tones in said image signal source, in accordance with said second type of modulation.

9. The signal input device according to claim 8 wherein the first type of modulation of said first modulator is frequency modulation by which the blinking frequency of said emitted infrared rays is specified and said blinking frequency is a frequency higher than the refresh rate of said on-screen pointing-position detector.

10. The signal input device according to claim 9 further comprising:

multi-point selection switch which is built in said light-pen so as to switch said frequency of said modulation signal.

11. The signal input device according to claim 9, wherein said frequency of said modulation signal increases or decreases according to the pressing force of said light-pen means.

12. The signal input device according to claim 8 further comprising:

multi-point selection switch which is built in said light-pen so as to switch said frequency of the modulated infrared rays.

13. The signal input device according to claim 8, wherein said frequency of the modulated infrared rays increases or decreases according to the pressing force of said light-pen.

* * * * *

UNITED STATES PATENT AND TRADEMARK OFFICE
CERTIFICATE OF CORRECTION

PATENT NO. : 5,818,421
DATED : 6 October 1998
INVENTOR(S) : Masanori OGINO et al.

It is certified that error appears in the above-indentified patent and that said Letters Patent is hereby corrected as shown below:

| Column | Line | |
|--------|------|---|
| 1 | 52 | Change "painting" to --pointing--. |
| 5 | 58 | Change "including" to --including:--. |
| 5 | 61 | After "screen" delete "first". |
| 5 | 62 | After "modulating" (second occurrence) delete ",". |
| 6 | 2 | After "modulation" insert --,--. |
| 6 | 27 | Change "Claim 3" to --Claim 2--. |
| 7 | 2 | Change "ashen" to --when--. |

Signed and Sealed this

Twenty-third Day of November, 1999

Attest:

Q. TODD DICKINSON

*Attesting Officer*  *Acting Commissioner of Patents and Trademarks*